United States Patent [19]

Nakamura et al.

[11] Patent Number: 5,343,756
[45] Date of Patent: Sep. 6, 1994

[54] ELECTROSTATIC CAPACITY TYPE DIFFERENTIAL PRESSURE DETECTOR

[75] Inventors: Kimihiro Nakamura; Tadanori Yuhara; Toshiyuki Takano; Hironobu Yao, all of Kanagawa, Japan

[73] Assignee: Fuji Electric Co., Ltd., Kanagawa, Japan

[21] Appl. No.: 917,276

[22] Filed: Jul. 23, 1992

[30] Foreign Application Priority Data

Jul. 26, 1991 [JP] Japan ................. 3-186699

[51] Int. Cl.⁵ .............................................. G01L 9/12
[52] U.S. Cl. ..................................... 73/718; 73/724; 361/281
[58] Field of Search ................. 73/718, 724; 361/281; 29/25.41

[56] References Cited

U.S. PATENT DOCUMENTS

| | | | |
|---|---|---|---|
| 4,735,098 | 4/1988 | Kavli et al. | 73/718 |
| 4,903,532 | 2/1990 | Tamai et al. | 73/718 |
| 5,056,369 | 10/1991 | Tamai et al. | 73/718 |

FOREIGN PATENT DOCUMENTS 2231159  11/1990 United Kingdom .

Primary Examiner—Richard E. Chilcot, Jr.
Assistant Examiner—William L. Oen
Attorney, Agent, or Firm—Young & Thompson

[57] ABSTRACT

An electrostatic capacity type differential pressure detector wherein capacitances are formed between a diaphragm as a movable electrode which is subjected to displacement depending on a differential pressure and fixed electrodes which are arranged on opposite sides of the diaphragm. Each of the fixed electrodes has a first electrically conductive plate closely adjoining and confronting a surface of a central portion of the diaphragm. An annular support is joined to the surface of a circumferential edge portion of the diaphragm and is spaced from and surrounds the outer circumferential surface of the first electrically conductive plate. A solid insulator completely fills an annular space between the first electrically conductive plate and the annular support and is spaced from the diaphragm. An insulating plate is commonly joined to each surface of the annular support and the first electrically conductive plate on the side of the annular support and conductive plate opposite the diaphragm; and a second electrically conductive plate is joined to the surface of the insulating plate opposite the diaphragm and is electrically connected with the first electrically conductive plate. There is a pressure introducing hole extending through the first and second electrically conductive plates and through the insulating plate. Both the first electrically conductive plate and the annular support are composed of silicon, the insulator being composed of a glass material which has a thermal expansion coefficient substantially that of silicon.

1 Claim, 5 Drawing Sheets

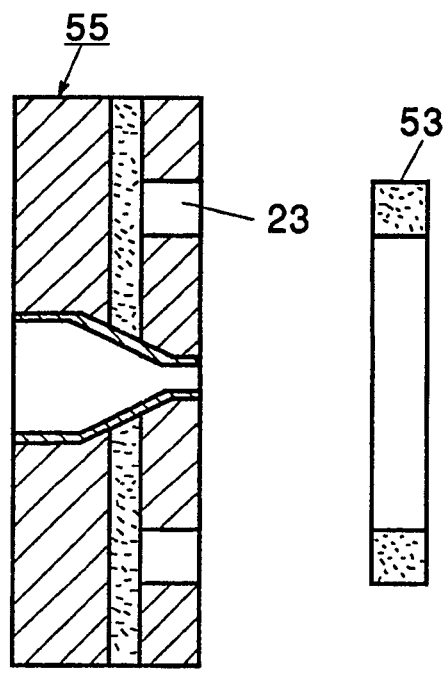
FIG. 4        FIG. 4A
FIG. 5
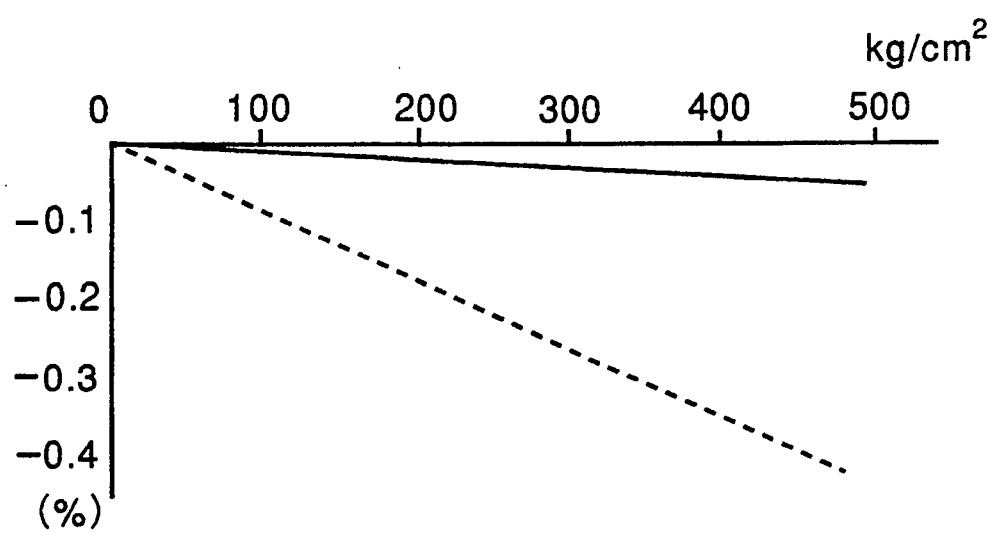

ELECTROSTATIC CAPACITY TYPE DIFFERENTIAL PRESSURE DETECTOR

FIELD OF THE INVENTION

This invention relates to an electrostatic capacity type differential pressure detector in which a differential pressure is measured on the basis of capacitances formed between a diaphragm as a movable electrode subjected to displacement depending on the differential pressure and fixed electrodes arranged at each side of the diaphragm, in particular to a detector which reduces the span fluctuation due to the static pressure.

BACKGROUND OF THE INVENTION

The prior art will be explained hereinafter with reference to drawings. FIG. 6 is a cross-sectional view of a conventional example. In FIG. 6, at each side of the diaphragm 10 is attached each of fixed electrodes 15 and 20. One fixed electrode 15 comprises a first electrically conductive plate 12 arranged to confront to the diaphragm 10, an insulating plate 13 joined to this first electrically conductive plate 12, and a second electrically conductive plate 14 joined to this insulating plate 13, in which the first electrically conductive plate 12 is electrically connected with the second electrically conductive plate 14 through a conductor film 27 coated on the inner circumference of a pressure introducing hole 25. On the other hand, the fixed electrode 15 is provided with an annular support 21 separated by a circular groove 23 joined to the insulating plate 13 to surround the first electrically conductive plate 12, and this support 21 is joined to the diaphragm 10 through a glass junction member 11 having a predetermined thickness, and the first electrically conductive plate 12 is electrically insulated from the support 21. Incidentally, the support 21 may be any one of an insulator or a conductor. Further, the fixed electrode 15 is opened with the above-mentioned pressure introducing hole 25 for introducing pressure P1 into an air gap 29 formed between the diaphragm 10 and the fixed electrode 15. Another fixed electrode 20 comprises a first electrically conductive plate 17 arranged to confront to the diaphragm 10, an insulating plate 18 joined to this first electrically conductive plate 17, and a second electrically conductive plate 19 joined to this insulating plate 18, in which the first electrically conductive plate 17 is electrically connected with the second electrically conductive plate 19 through a conductor film 28 coated on the inner circumference of a pressure introducing hole 26. On the other hand, the fixed electrode 20 is provided with an annular support 22 being separated by a circular groove 24 joined to the insulating plate 18 to surround the first electrically conductive plate 17, and this support 22 is joined to the diaphragm 10 through a glass junction member 16 having a predetermined thickness, and the first electrically conductive plate 17 is electrically insulated from the support 22. Incidentally, the support 22 may be any one of an insulator or a conductor. Further, the fixed electrode 20 has the above-mentioned pressure introducing hole 26 for introducing pressure P2 into an air gap 30 formed between the diaphragm 10. Further reference numerals 31, 32 and 33 indicate capacitance output conductors respectively.

A first capacitor is formed by the diaphragm 10 and the fixed electrode 15, and a capacitance C1 of this capacitor is taken out through each of lead pins A and C. Also, in the same manner, a second capacitor is formed by the diaphragm 10 and the fixed electrode 20, and a capacitance C2 of this capacitor is taken out through each of lead pins B and C. Now, when each of pressures P1 and P2 acts on the diaphragm 10, the diaphragm 10 provides displacement depending on a differential pressure therebetween (P1~P2), each of the capacitances C1 and C2 changes depending on the displacement, and the differential pressure can be measured on the basis of this change. By the way, the differential pressure detector shown in FIG. 6 is accommodated in a housing sealed by two seal diaphragms not shown in the figure for receiving each of the pressures P1 and P2, and in this housing is enclosed a non-compressible fluid such as for example silicone oil for transmission of pressure. Namely, each of the air gaps 29 and 30 and each of the pressure introducing holes 25 and 26 are filled with silicone oil.

FIG. 7 is a schematic diagram of capacitance represented by the fixed electrode 15 of the left side shown in FIG. 6 formed in the conventional example, and FIG. 8 is an equivalent circuit diagram concerning the capacitance of the conventional example as shown in FIG. 6. Incidentally, with respect to each capacitance at the right side, the symbol is 2 instead of 1 at the left side with providing the same values for corresponding those at the left and right. In FIG. 7 and FIG. 8, capacitance C10, C20, C11, C12, C13 and C14 are given by $$C10 = Co/(1-\Delta/d) = Ko\epsilon r/(1-\Delta/d) \quad (1)$$

$$C20 = Co/(1+\Delta/d) = Ko\epsilon r/(1+\Delta/d) \quad (2)$$

$$C11 = K1\epsilon r \quad (3)$$

$$C12 = K2\epsilon r \quad (4)$$

$$C13 = K3\epsilon c \quad (5)$$

$$C14 = K4\epsilon c \quad (6)$$

wherein

Co: common capacitance at the central portion when the differential pressure is zero, $\Delta$: displacement of the diaphragm on account of the differential pressure, d: air gap at the central portion when the differential pressure is zero, $\epsilon r$: dielectric constant of silicone oil, $\epsilon c$: dielectric constant of the insulating plate, Ko: constant determined by the shape of the central portion, K1, K2, K3, K4: constants determined by the shapes of each portion of C11, C12, C13, C14.

Provided that the overall capacitance between each of the lead pins A and C is C1, and the overall capacitance between each of the lead pins B and C is C2, there are given:

$$C1 = Ko\epsilon r/(1-\Delta/d) + K1\epsilon r + K2\epsilon r/(1+K2\epsilon r/K3\epsilon c) + K4\epsilon c \quad (7)$$

$$C2 = Ko\epsilon r/(1+\Delta/d) + K1\epsilon r + K2\epsilon r/(1+K2\epsilon r/K3\epsilon c) + K4\epsilon c \quad (8)$$

When these C1 and C2 change in a differential dynamic manner, the following signal f which is proportional to the differential pressure can be obtained by means of a well-known arithmetic operation circuit:

$$f = (C1-C2)/(C1+C2-\beta) = \Delta/d = k(P1 \sim P2) \quad (9)$$

wherein $\beta = 2[K1\epsilon r + K2\epsilon r/(1+K2\epsilon r/K3\epsilon c) + K4\epsilon c,$ $k$: proportional constant.

However, when this detector is driven under a high static pressure so as to take out a signal proportional to the differential pressure, the dielectric constant $\epsilon r$ of the non-compressible fluid, for example, silicone oil changes depending on the static pressure, so that such a problem has caused that the span becomes narrow. This problem will be explained hereinafter in detail. According to experiments by the inventors, when silicone oil is used, 1.3% of a change in the dielectric constant is given for 100 kg/cm² of a change in the static pressure, so that the dielectric constant $\epsilon r$ at the static pressure Ps can be represented as follows:

$$\epsilon r = \epsilon ro(1+0.013Ps/100) \quad (10)$$

However, $\epsilon ro$ is the dielectric constant at Ps=0 (under atmospheric pressure). When the equation (10) is substituted for each of the equations (7) and (8), and calculation is conducted using the following numerical values on the basis of the equation (9), in the case of representation in which the axis of abscissa is the static pressure and the axis of ordinate is the span fluctuation (%) as shown by the representation with a broken line in FIG. 5, the characteristic of the span fluctuation against the static pressure Ps, that is the influence of the static pressure is considerably large such that the span fluctuation is −0.35% for the static pressure of 400 kg/cm² In the meantime, the numerical values used for the calculation are as follows:

Δ/d=0.2
Ko=10.555
K1=0.7218
K2=0.1197
K2 $\epsilon$ro=0.323 (pF)
K3 $\epsilon$c=0.8498 (pF)

SUMMARY OF THE INVENTION

It is a task of this invention to solve the above-mentioned problem possessed by the prior art and provide an electrostatic capacity type differential pressure detector which reduces the span fluctuation due to the static pressure.

The electrostatic capacity type differential pressure detector provides in a detector wherein capacitances are formed between a diaphragm as a movable electrode which is subjected to displacement depending on a differential pressure and fixed electrodes which are arranged at each side of the diaphragm respectively, on the basis of which said differential pressure is measured, and wherein each of said fixed electrodes is provided with a first electrically conductive plate closely adjoining and confronting to the surface of the central portion of said diaphragm;

an annular support joined to the surface of a circumferential edge portion of said diaphragm separated from the outer circumferential surface of the first electrically conductive plate so as to surround it;

a solid insulator of completely filling an annular confronting space between said first electrically conductive plate and the annular support;

an insulating plate commonly joined to each surface of said annular support and said first electrically conductive plate at the reverse side to said diaphragm; and a second electrically conductive plate joined to the other surface of the insulating plate and electrically connected with said first electrically conductive plate, and a pressure introducing hole through the central portion.

The electrostatic capacity type differential pressure detector is also characterized in that the insulator is an annular molded article to be subjected to heat treatment after fitting to the annular confronting space between the first electrically conductive plate and the annular support.

The electrostatic capacity type differential pressure detector is still further characterized in that, provided that both the first electrically conductive plate and the annular support are composed of silicon, the insulator is composed of a glass material which has a thermal expansion coefficient close to that of silicon.

In the electrostatic capacity type differential pressure detector according to the present invention, the dielectric constant of the insulator which is provided at the annular confronting space between the first electrically conductive plate and the annular support does not change depending on the differential pressure, so that the capacitance concerning the annular confronting space does not change depending on the differential pressure.

In one aspect, in the electrostatic capacity type differential pressure detector, the insulator is constituted as the annular molded article, which is subjected to the heat treatment after being fitted to the annular confronting space between the first electrically conductive plate and the annular support.

In another aspect, in the electrostatic capacity type differential pressure detector, the insulator, the first electrically conductive plate and the annular support have approximately the same heat deformation amount with respect to the change in temperature.

BRIEF DESCRIPTION OF THE DRAWINGS

An example of the electrostatic capacity type differential pressure detector in accordance to this invention will be explained hereinafter with reference to the drawings.

FIGS. 4 and 4A are a cross-sectional view showing a main production step in the example as shown in FIG. 1.

FIG. 5 is a figure of characteristics of the span fluctuation against the static pressure.

PREFERRED EMBODIMENT OF THE INVENTION

Figure 6:
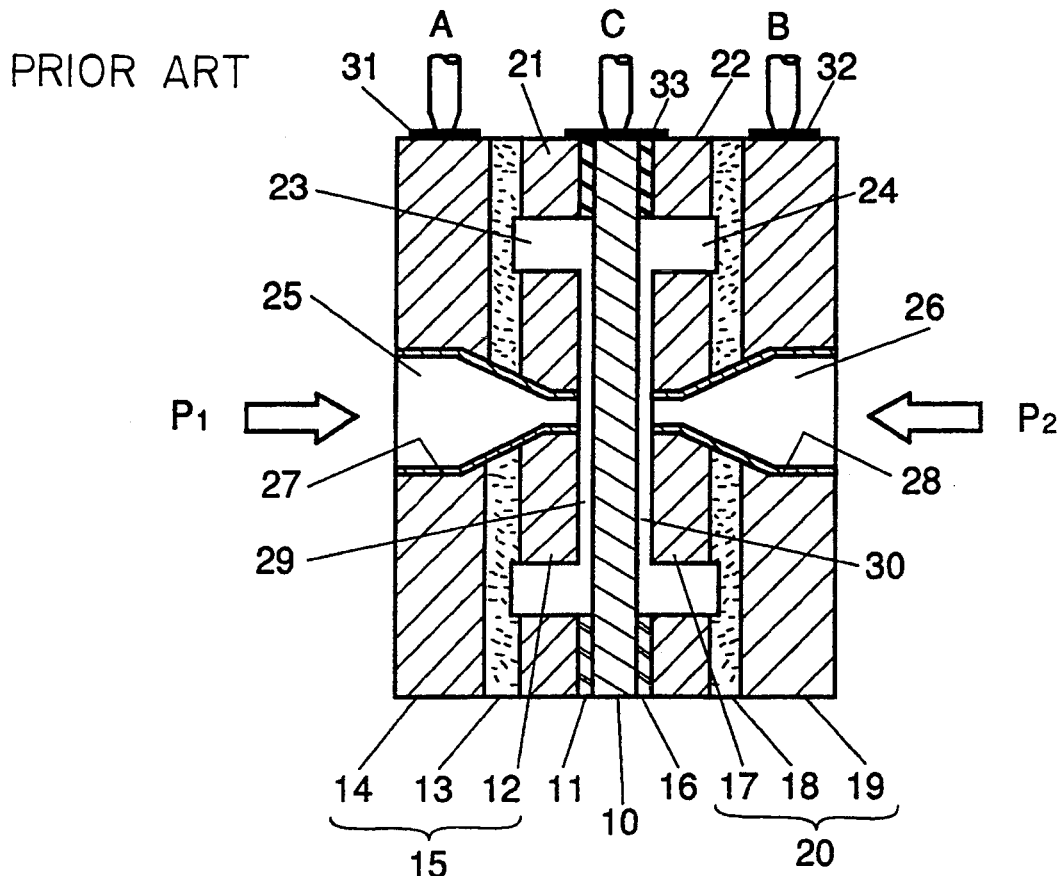
FIG. 6 is a cross-sectional view illustrative of the structure of the conventional electrostatic capacity type differential pressure detector.
Figure 7:
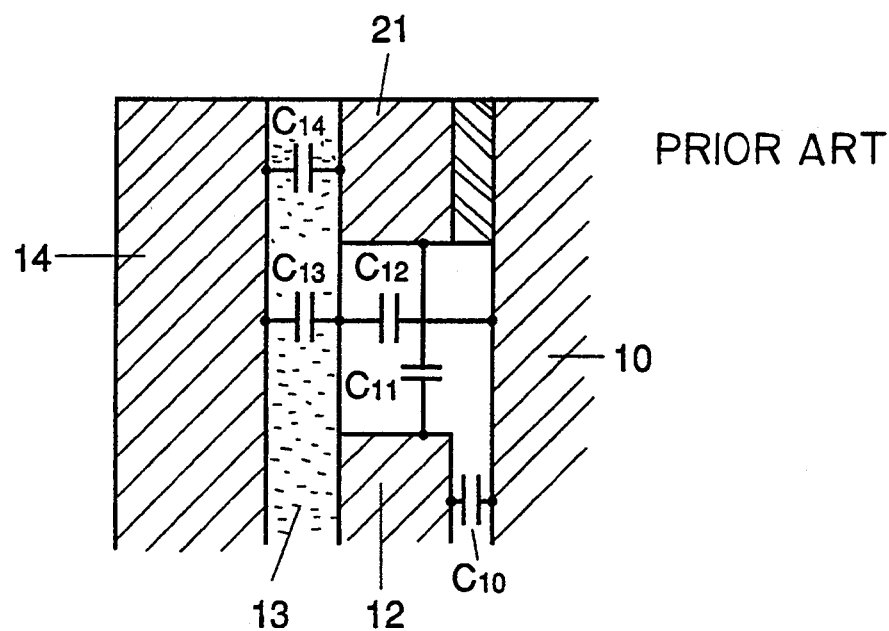
FIG. 7 is a schematic diagram of capacitance formed in the conventional example as shown in FIG. 6.
Figure 8:
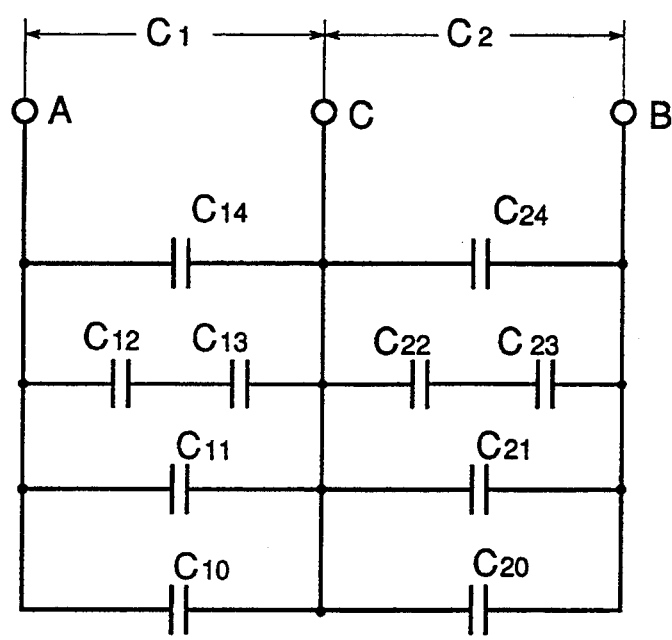
FIG. 8 is an equivalent circuit diagram concerning capacitance of the conventional example as shown in FIG. 6.

This example has such an arrangement that each of the circular grooves 23 and 24 in the conventional example shown in FIG. 6 is filled with glass 53 and 54 having a thermal expansion coefficient similar to that of silicon respectively. In this case, each of insulating plates are designated by symbols 43 and 48, and each of fixed electrodes are designated by symbols 55 and 56.

Figure 1:
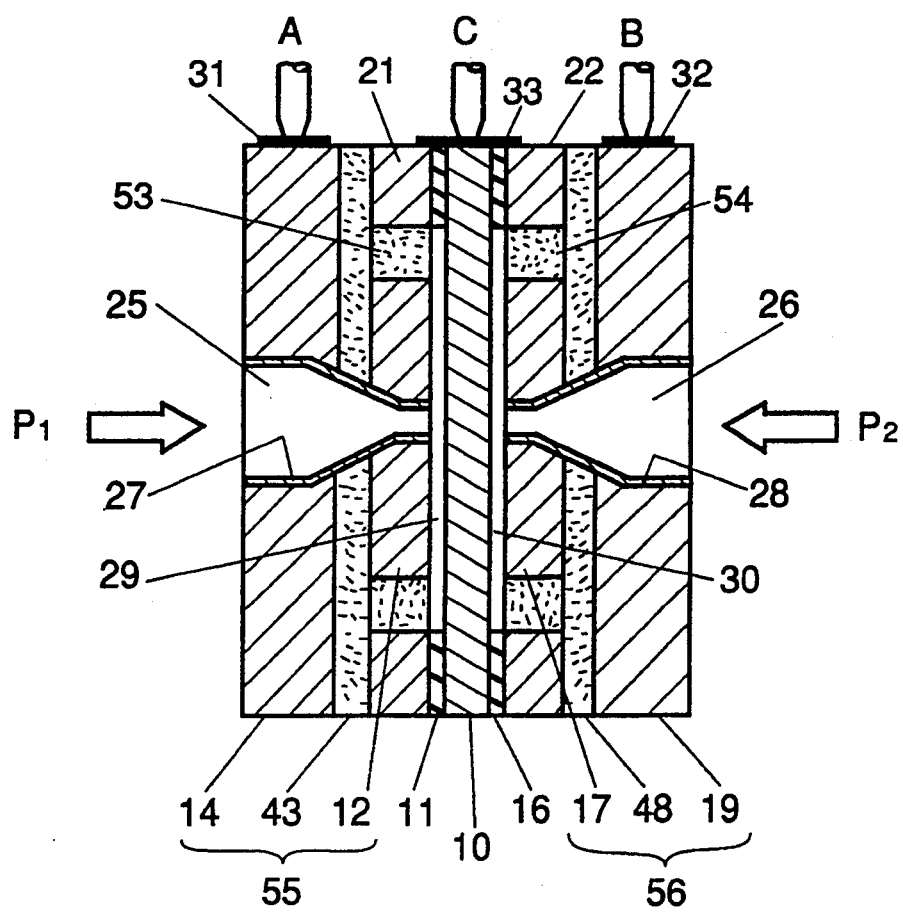
FIG. 1 is a cross-sectional view for an example of the electrostatic capacity type differential pressure detector concerning the present invention.

In FIG. 1, one fixed electrode 55 comprises a first electrically conductive plate 12 arranged to confront to the diaphragm 10, an insulating plate 43 joined to this first electrically conductive plate 12, and a second electrically conductive plate 14 joined to this insulating plate 43, in which the first electrically conductive plate 12 is electrically connected with the second electrically conductive plate 14 through a conductor film 27 coated on the inner circumference of a pressure introducing hole 25. On the other hand, the fixed electrode 55 is provided with an annular support 21 being separated by a circular groove 23 filled with a glass 53 and joined to the insulating plate 43 to surround the first electrically conductive plate 12, and this support 21 is joined to the diaphragm 10 through a glass junction member 11 having a predetermined thickness, and the first electrically conductive plate 12 is electrically insulated from the support 21. Incidentally, the support 21 may be any one of an insulator or a conductor. Further, the fixed electrode 55 is opened with the above-mentioned pressure introducing hole 25 for introducing pressure P1 into an air gap 29 formed between the diaphragm 10. While another fixed electrode 56 comprises a first electrically conductive plate 17 arranged to confront to the diaphragm 10, an insulating plate 48 joined to this first electrically conductive plate 17, and a second electrically conductive plate 19 joined to this insulating plate 48, in which the first electrically conductive plate 17 is electrically connected with the second electrically conductive plate 19 through a conductor film 28 coated on the inner circumference of a pressure introducing hole 26. On the other hand, the fixed electrode 56 is provided with an annular support 22 with being separated by a circular groove 24 filled with a glass 54 and joined to the insulating plate 18 to surround the first electrically conductive plate 17, and this support 22 is joined to the diaphragm 10 through a glass junction member 16 having a predetermined thickness, and the first electrically conductive plate 17 is electrically insulated from the support 22. Incidentally, the support 22 may be any one of an insulator or a conductor. Further, the fixed electrode 56 is provided with the above-mentioned pressure introducing hole 26 for introducing pressure P2 into an air gap 30 formed between the diaphragm 10 and the fixed electrode 56. Further reference numerals 31, 32 and 33 indicate capacitance output conductors respectively.

Incidentally, FIG. 4 is a cross-sectional view showing a main production step in the example, wherein a preliminary step is shown in which the glass 53 formed into a circular shape is fitted to the circular groove 23 (see FIG. 6). The glass 53 as the annular molded article is subjected to heat treatment after fitting, and the distortion is removed. Incidentally, instead of the glass 53 as the annular molded article, such a method is available that a glass material is mixed with a solvent to provide a paste state which is poured into the circular groove 23 followed by heat treatment.

Figure 2:
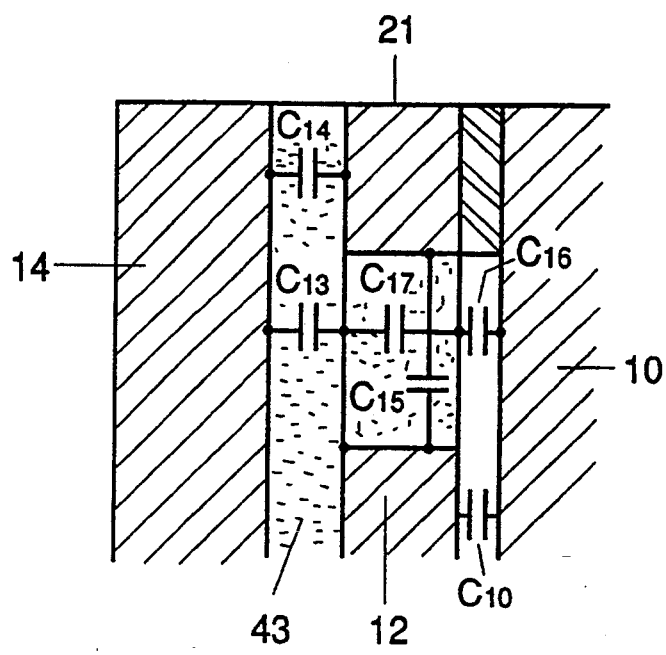
FIG. 2 is a schematic diagram of capacitance formed in the example as shown in FIG. 1.
Figure 3:
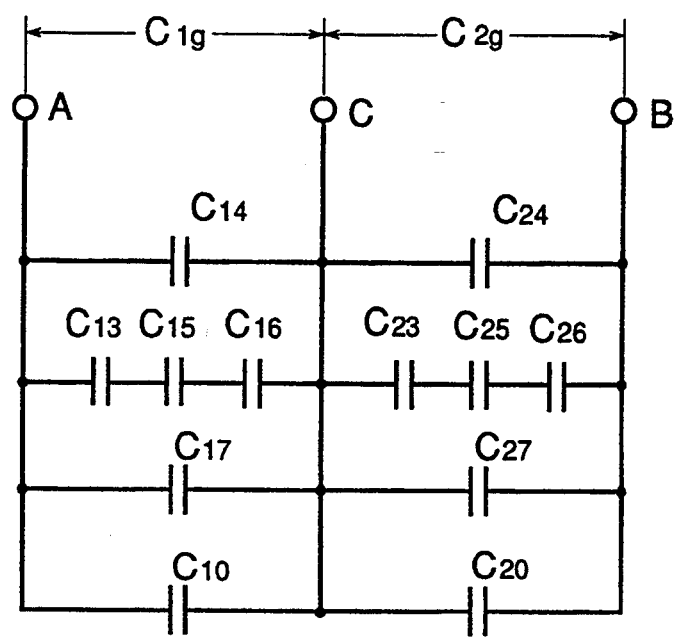
FIG. 3 is an equivalent circuit diagram concerning capacitance of the example as shown in FIG 1.

FIG. 2 is a schematic diagram of capacitance represented by the left side formed in the example, and FIG. 3 is an equivalent circuit diagram concerning the capacitance of the example. Incidentally, with respect to each capacitance at the right side, the symbol is 2 instead of 1 at the left side with providing the same values for corresponding those at the left and right. In FIG. 2 and FIG. 3, capacitance C15, C16 and C17 are given by:

$C15 = K5\epsilon rg$
$C16 = K6\epsilon r = K6\epsilon ro(1 + 0.013 \, Ps/100)$
$C17 = K7\epsilon rg$ wherein
 $\epsilon rg$: dielectric constant of glass
 K5, K6, K7: constants determined by the shapes of each portion of C15, C16, C17.

Provided that the overall capacitance between each of the lead pins A and C is C1g, and the overall capacitance between each of the lead pins B and C is C2g, there are given:

$$C1g = Ko\epsilon r/(1 - \Delta/d) + K5\epsilon rg + K6\epsilon r/[1 + K6\epsilon r(1/K7\epsilon rg + 1/K3\epsilon c)] + K4\epsilon c \quad (11)$$

$$C2g = Ko\epsilon r/(1 + \Delta/d) + K5\epsilon rg + K6\epsilon r/[1 + K6\epsilon r/(1/K7\epsilon rg + 1/K3\epsilon c)] + K4\epsilon c \quad (12)$$

In addition, the following equation is used instead of $\beta$ in the equation (9):

$$\beta = 2\{K5\epsilon rg + K6\epsilon ro/[1 + K6\epsilon ro/[1/K7\epsilon rg + 1/K3\epsilon c] + K4\epsilon c]\} \quad (13)$$

Thus, the equation (9) is substituted for each of the equations (11), (12) and (13), and calculation is conducted on the bais of the following numerical values. As a result, as shown by the representation with a solid line in FIG. 5, the characteristic of the span fluctuation against the static pressure Ps in the example, that is the influence of the static pressure has a small value which is 1/7 of −0.35% as compared with the span fluctuation in the conventional example such that the span fluctuation is −0.05% for the static pressure of 400 kg/cm². In the meantime, the numerical values used for the calculation are as follows:
 Δ/d = 0.2
 Ko = 10.555
 K6 = 0.76759
 K6 $\epsilon ro$ = 2.0711 (pF)
 K7 $\epsilon rg$ = 0.68162 (pF)
 K3 $\epsilon c$ = 0.8498 (pF)

In the electrostatic type differential pressure detector according to any one of claims 1 to 3, the dielectric constant of the insulator provided at the annular confronting space between the first electrically conductive plate and the annular support does not change depending on the differential pressure in contrast to the conventional example in which the dielectric constant of silicone oil filled in the annular confronting space has changed a little to be small depending on the static pressure, so that the capacitance concerning this annular confronting space also does not change depending on the differential pressure. As a result, the span fluctuation due to the static pressure could be remarkably reduced. For example, the span fluctuation could be −0.05% for the static pressure of 400 kg/cm², which could be 1/7 of −0.35% as compared with the span fluctuation in the conventional example.

In particular, in the electrostatic capacity type differential pressure detector, the insulator is constituted as the annular molded article which is subjected to the heat treatment after being fitted to the annular confronting space between the first electrically conductive plate and the annular support, so that the workability is excellent and it is possible to contemplate reduction in the number of steps of operation.

In particular, in the electrostatic capacity type differential pressure detector, the amounts of thermal deformation of the insulator, the first electrically conductive plate and the annular support are approximately the same with respect to temperature change, so that there is no fear of breakage due to the temperature change.

What is claimed is:

1. In an electrostatic capacity type differential pressure detector wherein capacitances are formed between a diaphragm as a movable electrode which is subjected to displacement depending on a differential pressure and fixed electrodes which are arranged on opposite sides of the diaphragm each of said fixed electrodes having
a first electrically conductive plate closely adjoining and confronting a surface of a central portion of said diaphragm;
an annular support joined to the surface of a circumferential edge portion of said diaphragm and spaced from and surrounding the outer circumferential surface of the first electrically conductive plate;
a solid insulator completely filling an annular space between said first electrically conductive plate and the annular support, said solid insulator being spaced from said diaphragm;
an insulating plate commonly joined to each surface of said annular support and said first electrically conductive plate on the side of said annular support and conductive plate opposite said diaphragm; and
a second electrically conductive plate joined to the surface of the insulating plate opposite the diaphragm and electrically connected with said first electrically conductive plate,
there being a pressure introducing hole extending through said first and second electrically conductive plates and through said insulating plate;
the improvement wherein both the first electrically conductive plate and the annular support are composed of silicon, the insulator being composed of a glass material which has a thermal expansion coefficient substantially that of silicon.

* * * * *